United States Patent

[11] 3,595,535

| | | |
|---|---|---|
| [72] | Inventor | Luigi Zaccaron<br>Viale Venezia 369, 33100 Udine, Italy |
| [21] | Appl. No | 747,966 |
| [22] | Filed | July 26, 1968 |
| [45] | Patented | July 27, 1971 |
| [32] | Priority | Nov. 18, 1969 |
| [33] | | Italy |
| [31] | | 833,443 |
| | | Continuation-in-part of application Ser. No. 610,968, Jan. 23, 1967, now Patent No. 3,415,498, dated Jan. 23, 1967. |

[54] FRAMES FOR CARRYING AND TRANSPORTING CONCRETE-MAKING SYSTEMS
3 Claims, 2 Drawing Figs.

| | | |
|---|---|---|
| [52] | U.S. Cl. | 259/165 |
| [51] | Int. Cl. | B28c 7/04 |
| [50] | Field of Search | 259/154, 161, 162, 164, 165, 149, 175, 176, 177 |

[56] References Cited
UNITED STATES PATENTS

| | | | |
|---|---|---|---|
| 831,658 | 9/1906 | Ericsson | 259/165 |
| 3,249,343 | 5/1966 | Siebeneicher | 259/154 |
| 3,151,849 | 10/1964 | Maxon | 259/161 |
| 3,189,327 | 6/1965 | Domenighetti | 259/154 X |
| 3,251,484 | 5/1966 | Hagan | 259/154 |
| 3,343,688 | 9/1967 | Ross | 259/154 X |

FOREIGN PATENTS

| | | | |
|---|---|---|---|
| 1,308,296 | 9/1962 | France | 259/154 |
| 394,916 | 12/1965 | Switzerland | 259/165 |

*Primary Examiner*—Robert W. Jenkins
*Attorney*—Birch and Birch

ABSTRACT: An expeditionary cement-mixing plant with the plurality of components needed for mixing the cement forming materials all mounted upon a wheel-supporting platform for transportation to the site of operations and including a swinging inert material or aggregate loader for picking up inert material or aggregate over adjacent areas with respect to the supported platform. All components including the swingable loader means being so proportioned and arranged on the platform as to be inboard of the platform during transportation to any desired cement mixing and spreading location.

PATENTED JUL 27 1971 3,595,535
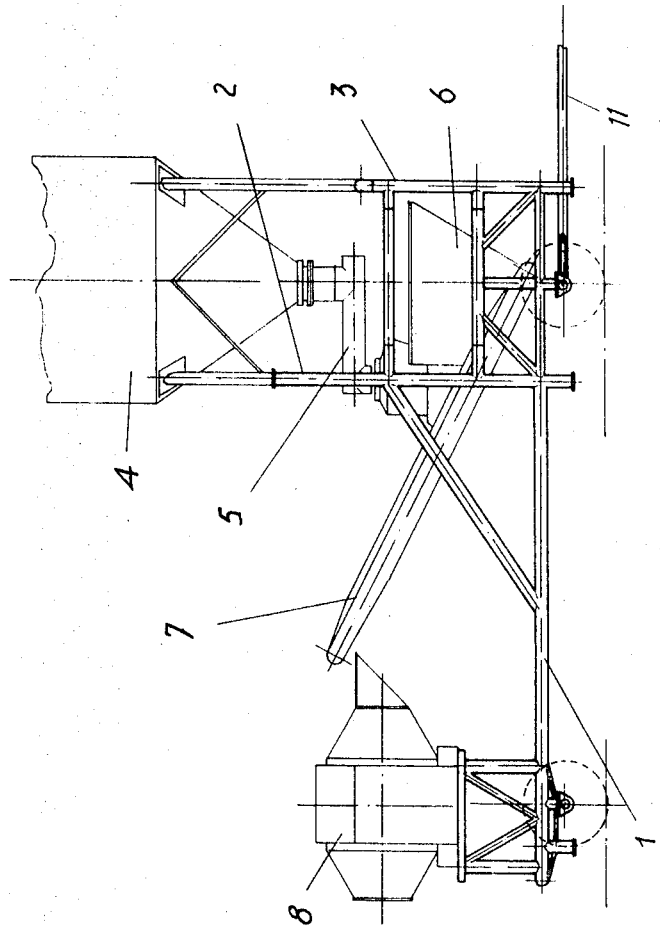
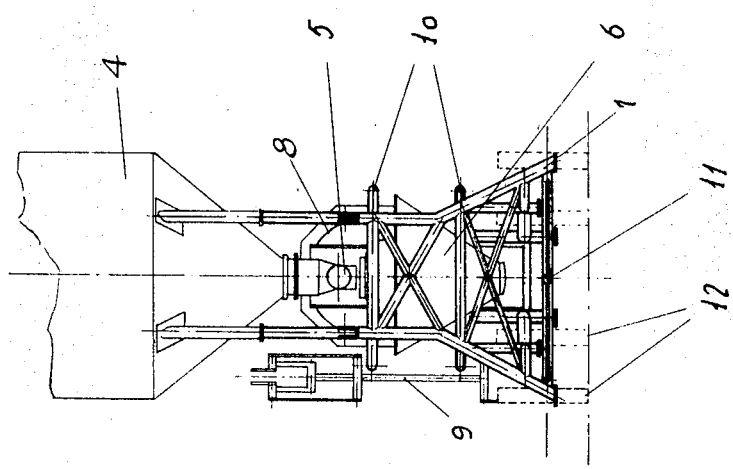
Inventor
LUIGI ZACCARON
By Birch and Birch
Attorney

FRAMES FOR CARRYING AND TRANSPORTING CONCRETE-MAKING SYSTEMS

The present invention relates to improvements in prior mobile concrete-mixing equipment, and is a continuation-in-part of my prior copending Pat. application, Ser. No. 610,968, filed Jan. 23, 1967 now U.S. Pat No. 3,415,498.

In my prior application, the mobile concrete-mixing equipment requires more than one transporting vehicle to move the concrete-mixing equipment to the site of the concrete mixing, and the inert material loading operations.

With the present improved arrangement, every component of the actual concrete-mixing system is so mounted and prearranged on a single wheel-supported platform so as to be ready for operation at a desired location, including the inert material loading of the system.

The principle object of this invention is to provide a complete expeditionary concrete-making combination of components prearranged and mounted on a wheel-supported chassis or platform including means to also transport the silo, whereby nothing is needed to be dismounted from the platform except the silo per se at a desired site of operation.

A further object of this invention is to provide in combination with a mobile platform, a premounted group of cement-mixing components, a conveyor means for loading inert material, said means being arranged to swing from pivotal connections on the frame structures on the platform in an arcuate sweep of an area adjacent the platform, to thereby pick up and load inert or aggregate materials from around the platform, and during road travel to a site of operation to be swung inboard of the mobile platform.

Another object is to novelly arrange the groups of cement-mixing components on a single platform, whereby the groups may be operated automatically or semiautomatically in a predetermined arranged cycle or in a prearranged cycle of operation imposed by the attendant at the site of operations.

With the above and other objects in view, the present novel device consists in the novel construction, arrangement and combination of parts described in the following specification and illustrated in the accompanying drawing, wherein one embodiment of the present invention is disclosed.

In the drawings, wherein like reference characters refer to like parts on the figures:

FIG. 1 is an end elevation view of the assembled and prearranged group of components as it appears from the forward steering wheel end thereof; and FIG. 2 is a side elevation view of the wheel-supported chassis or platform with the prearranged units or components thereof mounted on their respective frameworks.

Referring to the drawings, there is illustrated a premounted concrete-making, conveying and distributing group of components, including one or more bucket conveyors 9, which function as loaders for inert material or aggregate fitted on each side of the wheel supported platform 1 on which the group of cement-making components are mounted. These conveyor buckets or loaders 9 are mounted to pivot from the frame portions 10.

In reference to the several premounted concrete-making groups, which cooperate with the inert material or aggregate loader means 9, there are included a silo 4, screw cement conveyor 5, a weighing vat 6, which may be provided with two or three compartments, one for the cement and the other for the necessary inert materials to provide a cement mix, a conveyor belt 7, and a concrete mixer 8.

Said groups can be automatic or semiautomatic with a prearranged cycle or a cycle imposed by the operator.

The function of the elements making up the installation are known and are illustrated and described generally.

The conveyor loader means 9 is pivotally anchored on frame portions 10 connected to the silo legs, to thereby convey and load the inert materials that a chute conveys to the cement weighing vat 6 and, more precisely, selectively to the compartment intended for them. Loading of the inert materials continues until the desired load is reached; after this, the bucket loader means 9 may be stopped, and the cement conveyor 5 goes into operation. This conveyor 5 loads the cement, taken from silo 4, into the weighing vat 6, conveying it to the appropriate compartment until the desired weight of cement is reached. Operation of the loader means 9 before the cement conveyor is only by way of illustration, actually it could come afterwards or at the same time.

When the weighing vat 6 is loaded with the desired amount, conveyor belt 7 is put into operation and unloads all the cement and inert materials from vat 6 into concrete mixer 8 wherein the normal cycle of any mixer takes place.

Such an installation, as provided by this invention, involves enormous savings, particularly because of manpower reduction.

Such a system, if it is not premounted to thereby be easy to transport, cannot be nearly as advantageous because getting the group ready for operation would involve time and too much labor. Accordingly, as with the present invention, a suitable frame to contain all these elements is necessary to suitably anchor and support the premounted components and provide for hookup to any needed water and power sources; this saves much time and labor.

Heretofore, with frames of this type built according to the traditional concept for support of silos, it was not practical when transporting the wheeled platform assembly on the road to leave the mounted swingable loader means 9 in the pivot portions 10 because they would be outside the dimensions of the frame.

To eliminate this objectional feature and to permit the transporting of the premounted concrete-making group with only the silo detachable, so as to be dismounted at a destination site, a frame 1 is developed, as shown in heavy lines, suitable for containing and supporting all the apparatus necessary for a concrete-making system, shown in light lines, and to permit transport en bloc to a point of destination, after which silo 4 is dismounted for ground support. The silo may either be pulled into position, or it is possible to apply wheels 12 and a steering gear 11 thereto to facilitate positioning, or by loading it by means of a building crane on a trailer or a railroad car, not shown.

Mounting or dismounting of the silo takes place by the procedure already described by the present inventor in Ser. No. 610,968.

In the accompanying drawing, in FIGS. 1 and 2 of the invention, FIG. 1 specifically shows the group of units, looking from the transverse side, having the longitudinal side of the steering wheel 11, and FIG. 2 shows it according to the longitudinal side of the system.

FIG. 2 illustrates the concrete-mixing group completely mounted with wheels 12 and steering wheel 11.

Said figure shows silo legs 2 and 3 carrying the necessary brace structure coming out parallel until they meet the short legs attached to the silo. The shape of legs 2 and 3 is so as to provide for the rapid mounting and dismounting of the silo as described by the inventor of the present invention in Ser. No. 610,968; legs 3 provide a mount in which the whole silo is mounted and legs 2 provide the plane of support and arrangement for anchoring of the silo.

Between the two legs are mounted suitable reinforcements that also are intended to support the weight of vat 6 and belt conveyor 7.

In the back part of the frame is a suitable cradle or frame to support concrete mixer 8, and to permit the mounting of an axle for the back wheels 12 for transporting, and to permit the resitting of the frame on the ground by the formation of suitable depending extensions or foot members.

Legs 2 and 3 thus are provided with suitable feet for mounting of the frame on a surface, such as the ground or the like.

Legs 2 and 3 carry, outside, the reinforcement frame pivot portions 10, shown in FIG. 1, which pivotally support the aggregate conveyor loading means 9 and permit the said means to swing in an arc of at least 180°.

These reinforcement portions 10, as previously stated, are hinges pivoted to the loader means to permit swinging action thereof to each side of the mounting frame 1, to thereby pick up and load aggregate or the like into the weighing vat 6.

In case it is necessary, or desired, to mount a third loader, it may be pivotally connected to the free front side, its mounting being connected to suitable supports as part of the frame.

To provide stability against tipping, the feet of the silo are spread apart so that both legs 2 and 3 go down for a certain length and then spread at the foot or base portions to the maximum value permitted by the dimensions, thus obtaining all points of support of the silo legs at a steadying equal distance from the projection of the center of gravity of the silo to the ground.

Legs 2 and 3, instead of being spread, may go straight down and a lower bar, not shown, may be provided to act as a brace to the feet if preferred.

The graphic representation has only a hypothetical and illustrative purpose and is to read in this sense.

On the frame are placed suitable attachments for mounting wheels 12, or for that of steering wheel 11 with steering gear if necessary.

Without further description, it is believed that the advantages of the present invention over the prior art are apparent, and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What I claim is:

1. An expeditionary cement-making installation, comprising, in combination, a mobile frame means for transporting a cement-making installation, the respective components of said installation being mounted and prearranged, to thereby be self-contained on said frame means and movable as a unit to any desired site of cement-making operations without need for dismounting of any components of said installation, and arcuately swinging aggregate loading means pivoted to said frame means, said frame means being formed with leg means and hinges in combination with said swinging loader means, weighing means, mixing means, a cement conveyor for connecting from said weighing means to said mixing means, a silo and a conveyor belt for loading said mixing means, all components of the installation being mounted inboard of said frame and ready for operation without dismounting from said frame means for the cement-mixing operation, said loader means being swingable from outboard operating position to inboard idle position on said hinges.

2. An expeditionary cement-making installation as described in claim 1, wherein said swinging loader means are pivotally mounted to swing on external support means carried by said leg means, said loader means being arranged to be pressed against the frame means thereby providing for complete inboard positioning thereof for road transportation to different locations.

3. Frame means as described in claim 1, wherein the said frame legs carry suitable reinforcements on which said loader means are pivotally connected to permit freedom of each of said loader means to swing in an arc of approximately 180° with respect to each side of the said frame means, to thereby provide for loading inert material to be mixed from all angles of a substantially circular area at each side of said frame means.